(12) United States Patent
Nakanishi et al.

(10) Patent No.: US 12,181,487 B2
(45) Date of Patent: Dec. 31, 2024

(54) HIGH-PRESSURE CONTAINER INSPECTION METHOD AND HIGH-PRESSURE CONTAINER INSPECTION APPARATUS

(71) Applicant: HONDA MOTOR CO., LTD., Tokyo (JP)

(72) Inventors: Masaru Nakanishi, Wako (JP); Kosuke Tatsushima, Wako (JP); Fumihiro Aoki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 361 days.

(21) Appl. No.: 17/591,626

(22) Filed: Feb. 3, 2022

(65) Prior Publication Data
US 2022/0252493 A1    Aug. 11, 2022

(30) Foreign Application Priority Data
Feb. 10, 2021   (JP) .................. 2021-019686

(51) Int. Cl.
*G01N 9/00* (2006.01)
*F17C 1/02* (2006.01)
*F17C 13/02* (2006.01)

(52) U.S. Cl.
CPC ............... *G01N 9/00* (2013.01); *F17C 1/02* (2013.01); *F17C 13/02* (2013.01);
(Continued)

(58) Field of Classification Search
CPC ...... F17C 13/02; F17C 1/02; F17C 2221/012; F17C 2223/0123; F17C 2250/0404;
(Continued)

(56) References Cited

U.S. PATENT DOCUMENTS

2009/0121728 A1* 5/2009 Uozumi ............. B29C 53/8066
356/630
2015/0153002 A1* 6/2015 Tanabe ................. B29C 53/602
156/64
(Continued)

FOREIGN PATENT DOCUMENTS

CN  111307034    6/2020
JP  2010-000693  * 1/2010
(Continued)

OTHER PUBLICATIONS

Translation of JP2010-000693.*
(Continued)

*Primary Examiner* — Helen C Kwok
(74) *Attorney, Agent, or Firm* — Amin, Turocy & Watson, LLP

(57) ABSTRACT

A high-pressure container inspection method includes a photographing step, an acquiring step, and a determining step. In the photographing step, a carbon fiber is photographed while an outer surface of the carbon fiber wound on a converging portion in an outer peripheral surface of a liner is irradiated with light. In the acquiring step, density information obtained by the reflection of the light with respect to the outer surface of the carbon fiber by the photographing is acquired. In the determining step, the density information obtained by the acquiring step is compared with preset density information to determine whether a shape of a reinforcing layer of the converging portion is good or bad.

5 Claims, 8 Drawing Sheets

(52) U.S. Cl.
CPC .............. *F17C 2201/0109* (2013.01); *F17C 2203/012* (2013.01); *F17C 2203/0604* (2013.01); *F17C 2203/0619* (2013.01); *F17C 2203/066* (2013.01); *F17C 2203/0663* (2013.01); *F17C 2223/035* (2013.01)

(58) Field of Classification Search
CPC ........ F17C 2201/056; F17C 2201/0109; F17C 2203/0619; F17C 2203/066; F17C 2203/0663; F17C 2203/0604; G01N 9/00
See application file for complete search history.

(56) References Cited

U.S. PATENT DOCUMENTS

| | | | | |
|---|---|---|---|---|
| 2016/0341359 | A1* | 11/2016 | Nishibu | ................ B29C 53/605 |
| 2017/0241591 | A1* | 8/2017 | Nishibu | .................... F17C 1/06 |
| 2017/0297259 | A1* | 10/2017 | Otsubo | .................. B29C 65/48 |
| 2018/0272592 | A1* | 9/2018 | Kobayashi | ............ B29C 53/605 |
| 2020/0139610 | A1* | 5/2020 | Otsubo | ................ B29C 53/605 |
| 2020/0193216 | A1* | 6/2020 | Iida | ........................ B29C 31/004 |
| 2022/0112983 | A1* | 4/2022 | Otsubo | ...................... F17C 1/06 |
| 2022/0196206 | A1* | 6/2022 | Furuzawa | ................. F17C 1/06 |

FOREIGN PATENT DOCUMENTS

| | | | |
|---|---|---|---|
| JP | 2014-163874 | | 9/2014 |
| JP | 2015-107574 | | 6/2015 |
| JP | 2015-124846 | | 7/2015 |
| JP | 2015-139890 | | 8/2015 |
| JP | 2018-158562 | | 10/2018 |
| JP | 2018-176620 | | 11/2018 |
| JP | 2019-188753 | * | 10/2019 |
| JP | 2019-207004 | | 12/2019 |
| JP | 2020-094886 | | 6/2020 |

OTHER PUBLICATIONS

Japanese Office Action for Japanese Patent Application No. 2021-019686 mailed Aug. 23, 2022.
Chinese Office Action for Chinese Patent Application No. 202210116680.8 mailed Aug. 19, 2023.

* cited by examiner (a)

(b)

(a)

(b)

(a)

(b)

(a)

(b)

(c)

HIGH-PRESSURE CONTAINER INSPECTION METHOD AND HIGH-PRESSURE CONTAINER INSPECTION APPARATUS

CROSS-REFERENCE TO RELATED APPLICATION

Priority is claimed on Japanese Patent Application No. 2021-019686, filed Feb. 10, 2021, the content of which is incorporated herein by reference.

BACKGROUND OF THE INVENTION

Field of the Invention

The present invention relates to a high-pressure container inspection method and a high-pressure container inspection apparatus.

Description of Related Art

In a high-pressure container, a fiber bundle impregnated with resin is wound on an outer periphery of a liner and a reinforcing layer is formed by the wound fiber bundle (for example, a plurality of carbon fibers). Since the reinforcing layer is formed on the outer periphery of the liner, the liner is reinforced by the reinforcing layer and the pressure resistance (strength) of the high-pressure container is ensured.

Here, in order to ensure the pressure resistance of the high-pressure container, a high-pressure container inspection method of detecting the position of the carbon fiber wound on the outer periphery of the liner by an infrared camera and comparing the detected position of the carbon fiber with a predetermined position to determine whether the reinforcing layer is good or bad is known (for example, see Japanese Unexamined Patent Application, First Publication No. 2015-107574 (hereinafter, Patent Document 1)).

As another high-pressure container inspection method, a method of cutting a reinforcing layer of a high-pressure container for a sample in a post process after winding the fiber bundle and calculating an angle of the carbon fiber from a ratio (that is, an aspect ratio) between a major axis and a minor axis of a cross-section of the carbon fiber in a cut surface is known. According to this inspection method, the calculated fiber angle is compared with a reference angle to determine whether the reinforcing layer is good or bad (for example, see Japanese Unexamined Patent Application, First Publication No. 2015-124846 (hereinafter, Patent Document 2)).

SUMMARY OF THE INVENTION

Here, for example, a pressurized hydrogen gas is repeatedly stored in the high-pressure container, so that stress is repeatedly generated in the high-pressure container. It is known that the strength of a dome portion of the liner (hereinafter, also referred to as a converging portion) greatly affects the durability against this repeated stress. Therefore, in order to satisfactorily reinforce the converging portion with the reinforcing layer, it is preferable to evaluate the shape quality of the reinforcing layer in the converging portion.

However, since the high-pressure container inspection method of Patent Document 1 determines whether the reinforcing layer is good or bad by detecting the position of the carbon fiber, the shape of the converging portion cannot be evaluated.

Since the high-pressure container inspection method of Patent Document 2 determines whether the reinforcing layer is good or bad on the basis of the detected angle of the carbon fiber, the shape of the converging portion cannot be evaluated. Further, in the high-pressure container inspection method of Patent Document 2, the reinforcing layer of the high-pressure container for the sample needs to be cut in the post process after winding the fiber bundle.

An aspect of the present invention is made in view of such circumstances and an object is to provide a high-pressure container inspection method and a high-pressure container inspection apparatus capable of evaluating a shape of a reinforcing layer wound on a converging portion without touching a carbon fiber of the converging portion during winding of a fiber bundle.

In order to solve the above problems and achieve the above object, the present invention has adopted the following aspects.

(1) A high-pressure container inspection method according to an aspect of the present invention is a high-pressure container inspection method for a high-pressure container which includes a liner provided with a body portion and a converging portion connected to the body portion and having a metal fitting formed at an end portion and is formed by winding a plurality of layers of a carbon fiber on an outer periphery of the liner to form a reinforcing layer, the high-pressure container inspection method including: a photographing step of photographing at least an outer surface of the carbon fiber wound on the converging portion in the outer periphery while irradiating the outer surface with light; an acquiring step of acquiring density information obtained by the reflection of the light with respect to the outer surface of the carbon fiber by the photographing; and a determining step of determining whether a shape of the reinforcing layer of the converging portion is good or bad by comparing the density information obtained by the acquiring step with preset density information.

According to the above aspect (1), the density information of the light reflected from the outer surface is acquired by irradiating the outer surface of the carbon fiber wound on the liner (for example, the converging portion) with light. The acquired density information is compared with the preset density information to determine whether the shape of the reinforcing layer of the liner is good or bad. Thus, it is possible to highly accurately determine, for example, the curvature of the outer surface of the reinforcing layer formed by the carbon fiber without touching the carbon fiber wound on the liner or the like. Accordingly, it is possible to evaluate, for example, the good or bad shape of the reinforcing layer wound on the liner (for example, the converging portion) without touching the carbon fiber during the winding of the carbon fiber (specifically, the bundle of the carbon fibers). Hereinafter, the bundle of the carbon fibers is referred to as the "fiber bundle".

Further, according to the above aspect (1), it is possible to detect, for example, the lifting from the converging portion of the liner due to the loosening of the carbon fiber caused by, for example, a variation in tension of the carbon fiber in addition to the detection of the displacement of the carbon fiber during the winding of the carbon fiber by determining the curvature of the outer surface of the carbon fiber. Accordingly, it is possible to visually determine whether a specified tension is applied to the wound carbon fiber.

(2) In the above aspect (1), a curvature of the carbon fiber obtained from the density information may be compared with a preset curvature to determine whether the high-pressure container is good or bad.

According to the above aspect (2), it is determined whether the high-pressure container (for example, the reinforcing layer of the converging portion) is good or bad on the basis of the curvature of the carbon fiber obtained from the density information. Thus, it is possible to detect, for example, the lifting from the converging portion of the liner due to the loosening of the carbon fiber caused by a variation in tension of the carbon fiber. Accordingly, it is possible to visually determine whether a specified tension is applied to the wound carbon fiber.

(3) In the above aspect (1) or (2), the high-pressure container inspection method may further include a winding step of winding the carbon fiber on the outer periphery of the liner and the photographing may be performed in a condition that the carbon fiber passes through the converging portion by the winding of the carbon fiber.

According to the above aspect (3), the carbon fiber passing through the converging portion formed in a dome shape in the winding of the carbon fiber is photographed. Here, it is known that the converging portion is a dome-shaped portion and the shape of the reinforcing portion wound on the converging portion greatly affects, for example, the pressure resistance and durability of the high-pressure container. Accordingly, it is possible to provide the high-pressure container capable of withstanding an increase in internal pressure due to the hydrogen filling in the high-pressure container by photographing the curvature of the carbon fiber passing through the converging portion.

(4) In any one of the above aspects (1) to (3), the photographing may be performed whenever passing through the converging portion by the winding of the carbon fiber.

According to the above aspect (4), the carbon fiber is photographed whenever passing through the converging portion. Accordingly, since it is possible to quickly stop the rewinding of the carbon fiber or the winding of the carbon fiber during the winding of the carbon fiber, it is possible to provide the high-quality high-pressure container.

(5) In any one of the above aspects (1) to (4), a first photographing device configured to perform photographing to include a low helical winding forming portion provided with a low helical winding corresponding to a helical winding having an inclination angle of less than 50° with respect to a longitudinal direction of the body portion and a second photographing device configured to perform photographing to include a high helical winding forming portion provided with a high helical winding corresponding to a helical winding having an inclination angle of 50° or more may be provided, and the low helical winding forming portion may be photographed by the first photographing device and the second photographing device.

According to the above aspect (5), the low helical winding forming portion is photographed by the first photographing device and the second photographing device.

Here, the length of the carbon fiber (that is, the carbon fiber passing through the converging portion) of the low helical winding forming portion is longer than the carbon fiber of the high helical winding forming portion. By photographing the long carbon fiber using two devices which are the first photographing device and the second photographing device, it is possible to further highly accurately determine whether the curvature of the long carbon fiber is good or bad.

(6) A high-pressure container inspection apparatus according to an aspect of the present invention is a high-pressure container inspection apparatus including: a photographing unit configured to photograph a carbon fiber wound on at least a converging portion of a liner in a plurality of layers to form a reinforcing layer; a conversion unit configured to convert an image captured by the photographing unit into density information; a storage unit configured to store preset density information; a density information comparing unit configured to compare the density information of each layer stored in the storage unit with a threshold value of the preset density information of each layer; and a determination unit configured to determine whether a shape of the reinforcing layer is good or bad on the basis of a comparison result of the density information comparing unit.

According to the above aspect (6), the carbon fiber wound on the liner (for example, the converging portion) in a plurality of layers is photographed and the captured image is converted into the density information. The converted density information of each layer is compared with the threshold value of the preset density information of each layer to determine whether the shape of the reinforcing layer is good or bad on the basis of the comparison result.

Thus, it is possible to highly accurately determine, for example, the curvature of the outer surface of the reinforcing layer formed by the carbon fiber without touching the carbon fiber wound on the converging portion or the like of the liner. Accordingly, it is possible to determine whether the shape of the reinforcing layer wound on the liner (for example, the converging portion) is good or bad without touching the carbon fiber during the winding of the carbon fiber (specifically, the fiber bundle).

(7) In the above aspect (6), the high-pressure container inspection apparatus further includes a rotational driving member configured to rotate the liner and the photographing unit may be provided in a direction inclined from a rotating shaft of the rotational driving member.

According to the above aspect (7), the photographing unit is provided in a direction inclined from the rotating shaft of the rotational driving member. Thus, the photographing unit can be brought closer to (can be caused to face), for example, the portion (shoulder) having a large curvature in the carbon fiber wound on the converging portion of the liner. Accordingly, it is possible to highly accurately photograph, for example, the curvature of the outer surface of the carbon fiber in the converging portion of the liner by the photographing unit. Thus, it is possible to highly accurately determine the curvature of the outer surface of the carbon fiber in the converging portion of the liner.

(8) In the above aspect (6) or (7), the photographing unit may include a first photographing device configured to perform photographing to include a low helical winding forming portion provided with a low helical winding corresponding to a helical winding having an inclination angle of less than 50° with respect to a longitudinal direction of a body portion of the liner and a second photographing device configured to perform photographing to include a high helical winding forming portion provided with a high helical winding corresponding to a helical winding having an inclination angle of 50° or more, and the low helical winding forming portion may be photographed by the first photographing device and the second photographing device.

According to the above aspect (8), the low helical winding forming portion is photographed by the first photographing device and the second photographing device.

Here, the length of the carbon fiber (that is, the carbon fiber passing through the converging portion) of the low helical winding forming portion is longer than the carbon fiber of the high helical winding forming portion. By photographing the long carbon fiber using two devices which are the first photographing device and the second photographing device, it is possible to further highly accurately determine whether the curvature of the long carbon fiber is good or bad.

According to the aspects of the present invention, it is possible to evaluate the shape of the reinforcing layer wound on the converging portion without touching the carbon fiber of the converging portion during the winding of the fiber bundle.

DETAILED DESCRIPTION OF THE INVENTION

Hereinafter, a high-pressure container inspection method and a high-pressure container inspection apparatus according to an embodiment of the present invention will be described with reference to the drawings.

The application of a high-pressure container is not particularly limited, but in the embodiment, the high-pressure container will be described as, for example, a high-pressure tank for supplying a fuel gas of a fuel cell vehicle. The high-pressure container constitutes a part of a fuel cell system and supplies a fuel gas to a fuel cell. The fuel gas stored in the high-pressure container is a flammable high-pressure gas such as a hydrogen gas or a compressed natural gas.

High-Pressure Container

Figure 1:
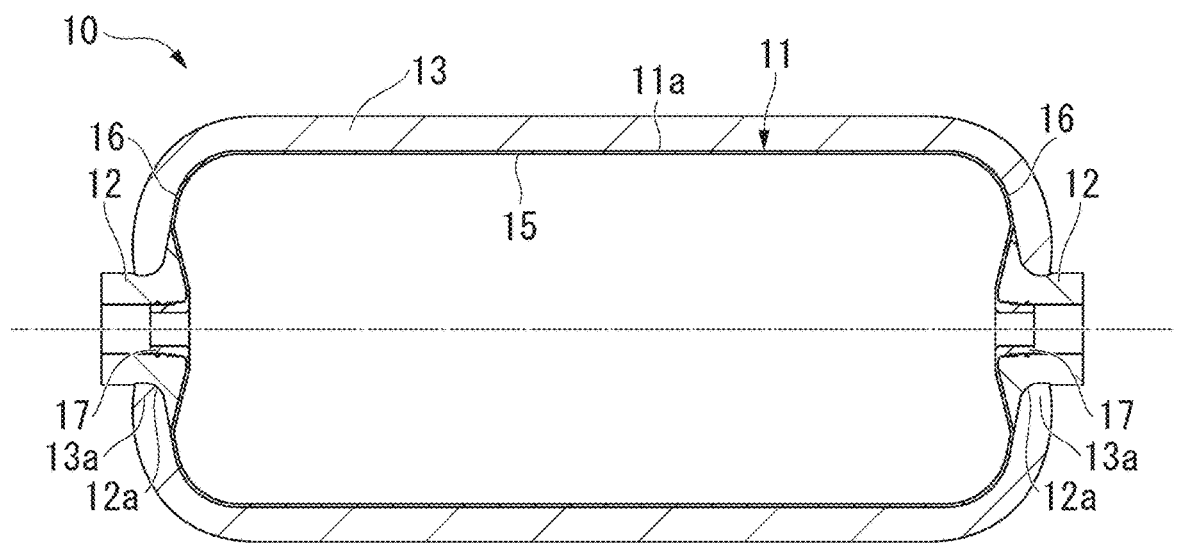
FIG. 1 is a cross-sectional view showing a high-pressure container according to an embodiment of the present invention.

As shown in FIG. 1, a high-pressure container 10 includes a liner 11 which is formed in a hollow shape, a metal fitting 12 which is attached to both end portions of the liner 11 in the axial direction, and a reinforcing layer 13 which is formed on an outer peripheral surface (outer periphery) 11a of the liner 11. Hereinafter, the axial direction of the liner 11 (specifically, a body portion 15) is simply referred to as the "axial direction". The radial direction of the liner 11 is simply referred to as the "radial direction".

The liner 11 is formed as a hollow body by, for example, a polyethylene resin, a polyamide resin, or another hard resin. The liner 11 is formed as a hollow body having a substantially elliptical cross-section in the axial direction and stores a pressurized hydrogen gas (fluid). The liner 11 includes the body portion 15, a converging portion (dome portion) 16, and a tubular portion 17.

The body portion 15 is formed in, for example, a tubular shape having a substantially circular cross-section in the radial direction. The converging portion 16 is connected to both end portions of the body portion 15 in the axial direction and is formed in a substantially dome shape so that the diameter (convergence) gradually decreases toward the outside of the body portion 15 in the axial direction. The tubular portions 17 respectively protrude from the center end portions (end portions) of the pair of converging portions 16 toward the outside (opposite side) of the body portion 15 in the axial direction.

The metal fitting 12 is attached to the tubular portion 17. That is, the metal fitting 12 is provided at the center end portion of the converging portion 16. The reinforcing layer 13 is formed on the metal fitting 12 and the liner 11.

For example, the reinforcing layer 13 is formed such that a fiber bundle 25 (see FIG. 7(a)) impregnated with resin is wound on an outer peripheral surface 11a of the liner 11 and a recessed portion 12a of the metal fitting 12 in a plurality of layers. Specifically, for example, the reinforcing layer 13 includes a hoop winding forming portion in which the fiber bundle impregnated with resin is wound in a hoop winding in the circumferential direction of the liner 11 and a helical winding forming portion in which the fiber bundle impregnated with resin is wound in a helical winding in a direction inclined with respect to the axial direction of the liner 11. The fiber bundle impregnated with resin is, for example, carbon fiber reinforced plastics (CFRP) and is obtained such that a bundle in which a plurality of carbon fibers are bundled and the carbon fibers in the bundle are impregnated with an epoxy resin as a matrix resin. Hereinafter, the fiber bundle impregnated with resin may be simply abbreviated as a "fiber bundle".

The reinforcing layer 13 is formed by curing the resin of the fiber bundle 25 (see FIG. 7(a)) wound on the outer peripheral surface 11a of the liner 11 and reinforces the liner 11 in this state. A tip portion 13a of the reinforcing layer 13 is in close contact with the recessed portion 12a of the metal fitting 12.

Next, an inspection apparatus 50 (see FIG. 2) for the high-pressure container 10 will be described.

High-Pressure Container Inspection Apparatus

Figure 2:
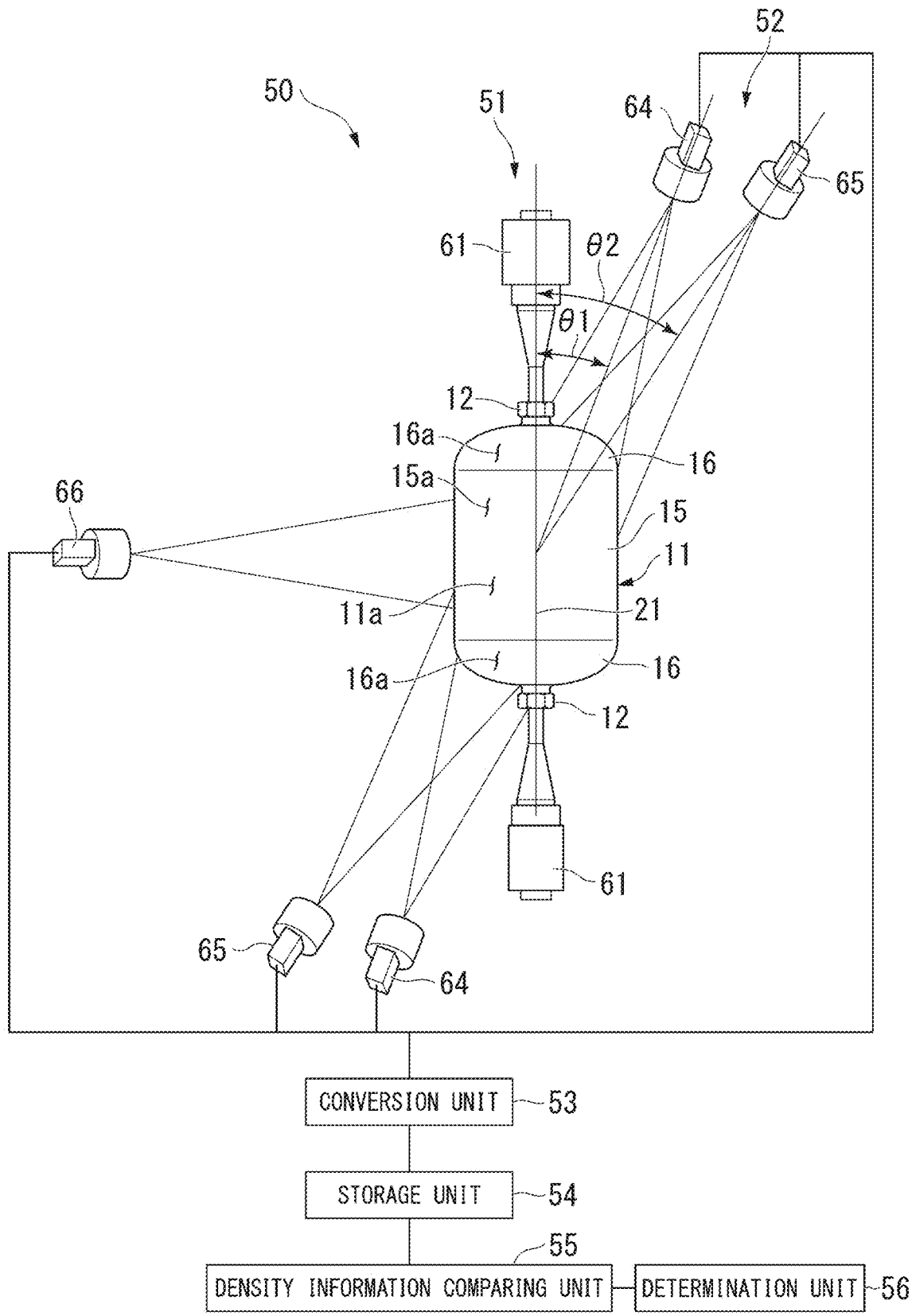
FIG. 2 is a conceptual diagram showing a high-pressure container inspection apparatus according to an embodiment of the present invention.

As shown in FIG. 2, the inspection apparatus 50 for the high-pressure container 10 includes a rotational driving member 51, a photographing unit 52, a conversion unit 53, a storage unit 54, a density information comparing unit 55, and a determination unit 56.

The rotational driving member 51 is a member that rotates the liner 11 around an axis 21 of the liner 11 by supporting the metal fittings 12 provided on both sides of the liner 11 with a rotating shaft 61 in the axial direction and rotating the rotating shaft 61.

For example, the photographing unit 52 photographs the reinforcing layer 13 (see FIG. 1) of the carbon fiber 26 (that is, the fiber bundle 25) (both see FIG. 7(a)) wound in a plurality of layers on the body portion 15 and the converging portion 16 of the liner 11. Specifically, the photographing unit 52 includes a first photographing device 64, a second photographing device 65, and a third photographing device 66.

The first photographing device 64 is provided in a direction inclined by 01 from the rotating shaft 61 (the axial direction) of the rotational driving member 51. As the first photographing device 64, for example, an infrared camera is used. The photographing of the first photographing device 64 is performed to include a low helical winding forming portion provided with a low helical winding in the converging portion 16 of the liner 11. The low helical winding forming portion is the reinforcing layer of the converging portion 16 formed by winding the fiber bundle 25 (see FIG. 7(a)) in the low helical winding which is the helical winding having an inclination angle of less than 50° with respect to the axial direction (the longitudinal direction) of the liner 11.

When the low helical winding forming portion is irradiated with light from a light source, the outer surface of the carbon fiber 26 of the low helical winding forming portion is irradiated with light. In this state, the first photographing device 64 captures an image obtained by the reflection of the light with respect to the outer surface of the carbon fiber 26 of the low helical winding forming portion.

The second photographing device 65 is provided in a direction inclined by θ2 from the rotating shaft 61 (the axial direction) of the rotational driving member 51. As the second photographing device 65, for example, an infrared camera is used. The photographing of the second photographing device 65 is performed to include a high helical winding forming portion provided with a high helical winding in addition to the low helical winding forming portion in the converging portion 16 of the liner 11. The high helical winding forming portion is the reinforcing layer of the converging portion 16 formed by winding the fiber bundle 25 (see FIG. 7(a)) in the high helical winding which is the helical winding having an inclination angle of 50° or more with respect to the axial direction (the longitudinal direction) of the liner 11.

When the low helical winding forming portion and the high helical winding forming portion are irradiated with light from a light source, the outer surface of the carbon fiber 26 of the low helical winding forming portion and the high helical winding forming portion is irradiated with light. In this state, the second photographing device 65 captures an image obtained by the reflection of the light with respect to the outer surface of the carbon fiber 26 of the low helical winding forming portion and the high helical winding forming portion.

That is, the carbon fiber 26 (see FIG. 7(a)) of the low helical winding forming portion is photographed by the first photographing device 64 and the second photographing device 65.

The third photographing device 66 is provided in a direction orthogonal to (intersecting) the axial direction in the body portion 15 of the liner 11. As the third photographing device 66, for example, an infrared camera is used. The photographing of the third photographing device 66 is performed to include a hoop winding forming portion provided with a hoop winding in the circumferential direction of the body portion 15 in the body portion 15 of the liner 11.

When the hoop winding forming portion is irradiated with light from a light source, the outer surface of the carbon fiber 26 (see FIG. 7(a)) of the hoop winding forming portion is irradiated with light. In this state, the third photographing device 66 captures an image obtained by the reflection of the light with respect to the outer surface of the carbon fiber 26 of the hoop winding forming portion.

The conversion unit 53 converts the images captured by the first photographing device 64, the second photographing device 65, and the third photographing device 66 into the density information of the light reflected from the outer surfaces of the carbon fibers 26 (see FIG. 7(a)) forming the respective winding forming portions.

The storage unit 54 stores the density information of each layer of the low helical winding forming portion, the high helical winding forming portion, and the hoop winding forming portion converted by the conversion unit 53. The storage unit 54 stores preset specified density information of each layer of the low helical winding forming portion, the high helical winding forming portion, and the hoop winding forming portion.

The density information comparing unit 55 compares the density information of each layer converted by the conversion unit 53 and stored in the storage unit 54 with a threshold value of the preset density information of each layer.

The determination unit 56 determines whether the shape of the reinforcing layer 13 (that is, each layer of the low helical winding forming portion, the high helical winding forming portion, and the hoop winding forming portion) is good or bad on the basis of the comparison result of the density information comparing unit 55.

Next, an inspection method for the high-pressure container 10 will be described.

High-Pressure Container Inspection Method

Figure 3:
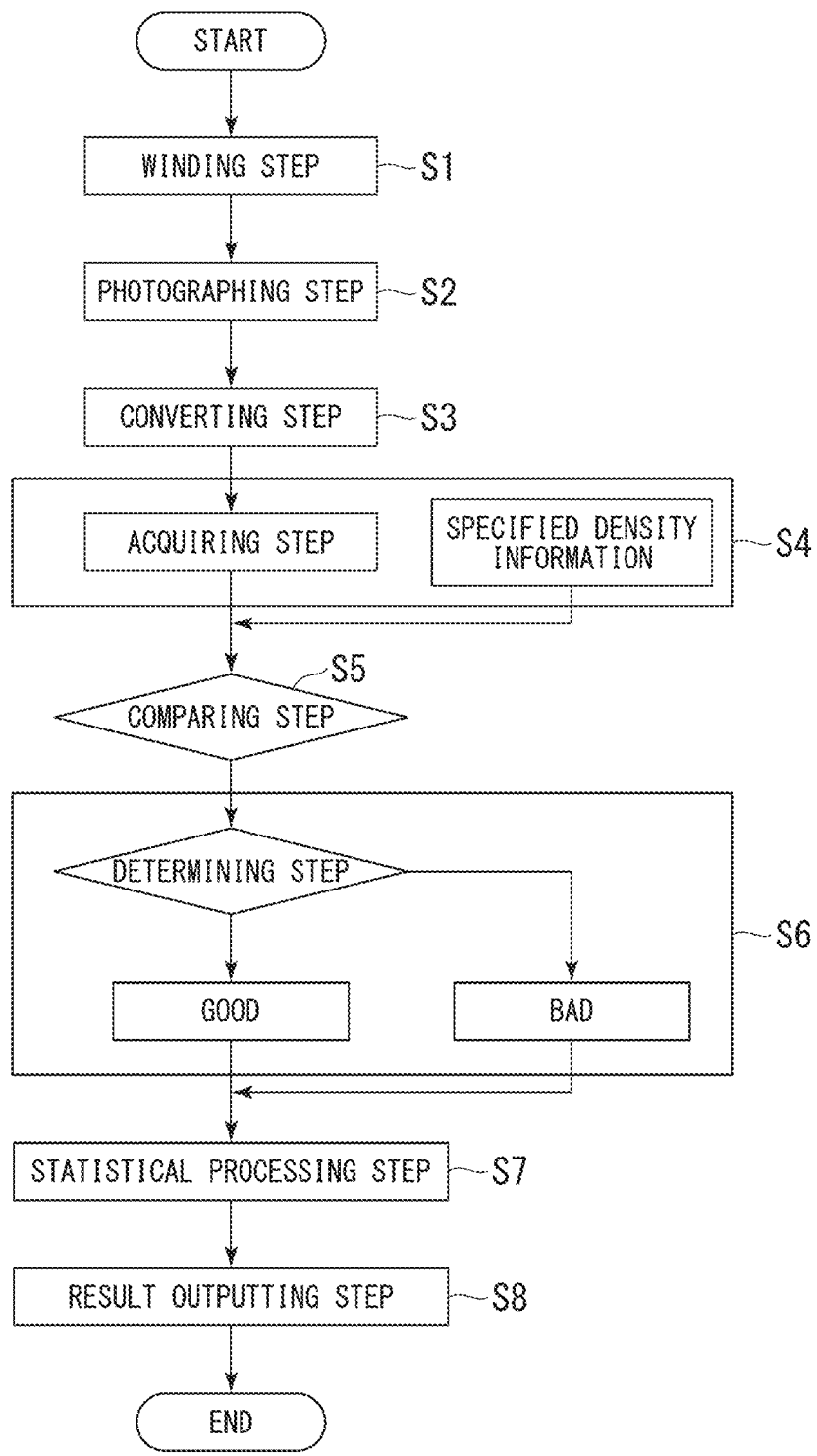
FIG. 3 is a flowchart showing a high-pressure container inspection method according to an embodiment of the present invention.

As shown in FIGS. 2 and 3, the high-pressure container inspection method includes, for example, a winding step, a photographing step, a converting step, an acquiring step, a comparing step, a determining step, a statistical processing step, and a result outputting step.

In the winding step, the fiber bundle 25 (see FIG. 7(a)) is wound on the outer peripheral surface 11a of the liner 11 (step S1). Specifically, the fiber bundle 25 is wound in the hoop winding on the outer peripheral surface 15a of the body portion 15 in the liner 11 in the circumferential direction. The fiber bundle 25 is wound in the helical winding in a direction inclined with respect to the axial direction in the outer peripheral surface 16a of the converging portion 16 of the liner 11. Here, the fiber bundle 25 is wound on the converging portion 16 in the low helical winding and the high helical winding.

In the photographing step, the outer surface of the carbon fiber 26 is photographed while the outer surface of the fiber bundle 25 (that is, the carbon fiber 26) (both see FIG. 7(a)) wound on the outer peripheral surface 11a of the liner 11 is irradiated with light (step S2).

Specifically, for example, the third photographing device 66 photographs the outer surface of the carbon fiber 26 while the outer surface of the fiber bundle 25 (the carbon fiber 26) wound in the hoop winding on the outer peripheral surface 15a of the body portion 15 in the liner 11 is irradiated with light from the light source.

The photographing is performed by the third photographing device 66 in a condition that the carbon fiber 26 wound in the hoop winding or the helical winding passes through the body portion 15 by the winding of the carbon fiber 26. The photographing is performed by the third photographing device 66 whenever the carbon fiber 26 passes through the body portion 15 by the winding of the carbon fiber 26 in the hoop winding or the helical winding.

For example, the first photographing device 64 photographs the outer surface of the carbon fiber 26 while the outer surface of the carbon fiber 26 wound in the low helical winding on the outer peripheral surface 16*a* of the converging portion 16 in the liner 11 is irradiated with light from the light source.

The photographing is performed by the first photographing device 64 in a condition that the carbon fiber 26 wound in the low helical winding passes through the converging portion 16 by the winding of the carbon fiber 26. The photographing is performed by the first photographing device 64 whenever the carbon fiber 26 passes through the converging portion 16 by the winding of the carbon fiber 26 in the bottom helical winding.

Further, for example, the second photographing device 65 photographs the outer surface of the carbon fiber 26 while the outer surface of the carbon fiber 26 wound in the high helical winding on the outer peripheral surface 16*a* of the converging portion 16 in the liner 11 is irradiated with light from the light source. In addition, the second photographing device 65 photographs the outer surface of the carbon fiber 26 wound in the low helical winding on the outer peripheral surface 16*a* of the converging portion 16 in the liner 11.

That is, the low helical winding forming portion is photographed by the first photographing device 64 and the second photographing device 65.

The photographing is performed by the second photographing device 65 in a condition that the carbon fiber 26 wound in the low helical winding and the high helical winding passes though the converging portion 16 by the winding of the carbon fiber 26. The photographing is performed by the second photographing device 65 whenever the carbon fiber 26 passes through the converging portion 16 by the winding of the carbon fiber 26 in the low helical winding and the high helical winding.

In the converting step, the conversion unit 53 converts the images captured by the first photographing device 64, the second photographing device 65, and the third photographing device 66 into the density information of the light reflected from the outer surfaces of the carbon fibers 26 respectively forming the winding forming portions (step S3).

Figure 4:
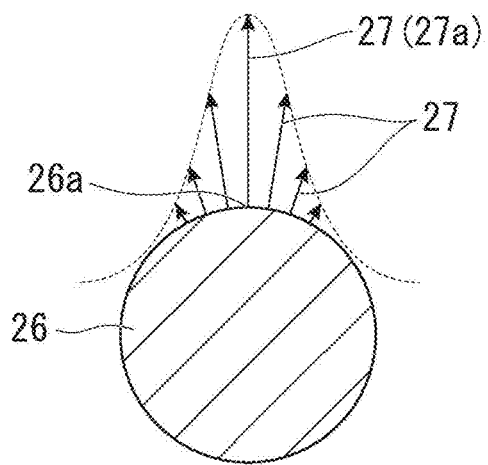
FIG. 4 is a diagram illustrating the reflection of light of a carbon fiber wound on a liner of the embodiment.

Here, as shown in FIG. 4, one carbon fiber 26 is formed, for example, with a circular cross-section and a curved surface having a black surface. Since the reflected light 27 of the carbon fiber 26 that can be received by the photographing device 71 (see FIG. 5(*a*)) such as an infrared camera is extremely limited, the difference in the shape of the carbon fiber 26 is likely to appear in the captured image.

Figure 5:
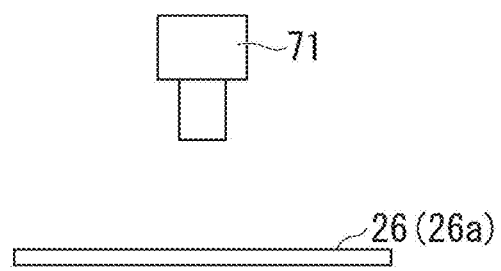
FIG. 5(a) is a diagram showing a state in which a linear carbon fiber is photographed and FIG. 5(b) is a diagram showing an image obtained by photographing the linear carbon fiber.
Figure 5:
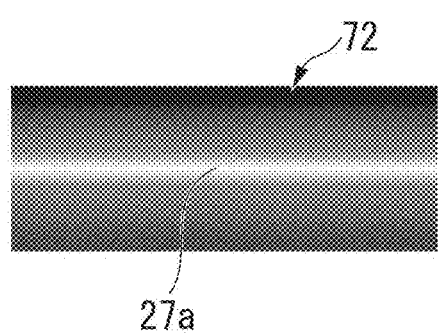

For example, as shown in FIGS. 4 and 5(*a*), when one carbon fiber 26 is stretched in a linear shape, the amount of the reflected light at a portion 26*a* closest to the photographing device 71 increases. Thus, as shown in FIG. 5(*b*), in an image 72 captured by the photographing device 71, the reflected light 27*a* at the portion 26*a* closest to the photographing device 71 is projected in a linear shape.

Figure 6:
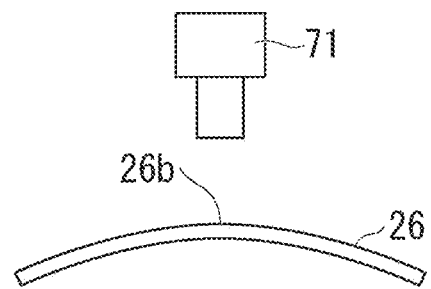
FIG. 6(a) is a diagram showing a state in which a curved carbon fiber is photographed and FIG. 6(b) is a diagram showing an image obtained by photographing the curved carbon fiber.
Figure 6:
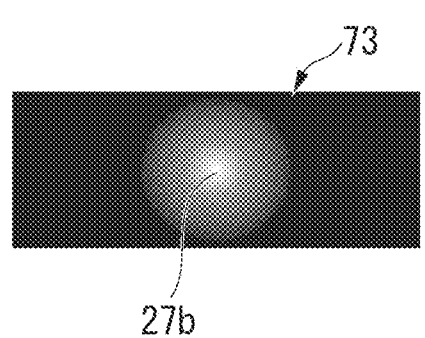

As shown in FIG. 6(*a*), when one carbon fiber 26 is bent in a curved shape to project toward the photographing device 71, the amount of the reflected light at a portion 26*b* closest to the photographing device 71 increases. Thus, as shown in FIG. 6(*b*), in an image 73 captured by the photographing device 71, the reflected light 27*b* at the portion 26*b* closest to the photographing device 71 is projected in a spot shape.

Figure 7:
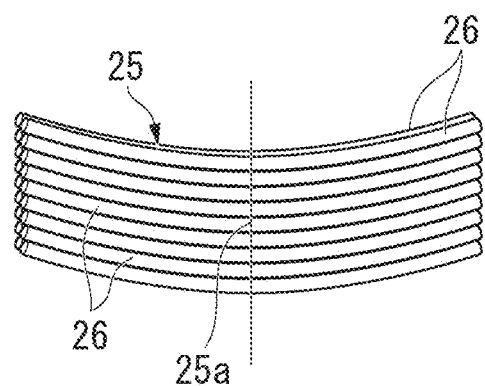
FIG. 7(a) is a diagram showing a state in which a curved fiber bundle is photographed and FIG. 7(b) is a diagram showing an image obtained by photographing the curved fiber bundle.
Figure 7:
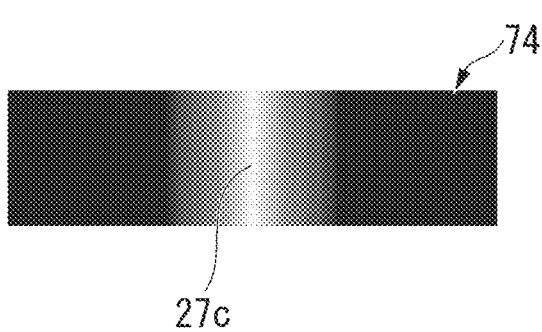

As shown in FIG. 7(*a*), when the fiber bundle 25 (the plurality of carbon fibers 26) is bent in a curved shape to protrude toward the photographing device 71 (see FIG. 6), the amount of the reflected light at the portion 25*a* closest to the photographing device 71 in the plurality of carbon fibers 26 increases. Thus, as shown in FIG. 7(*b*), in an image 74 captured by the photographing device 71, the reflected light 27*c* at the portion 25*a* closest to the photographing device 71 in the plurality of carbon fibers 26 is continuously projected in a linear shape.

Figure 8:
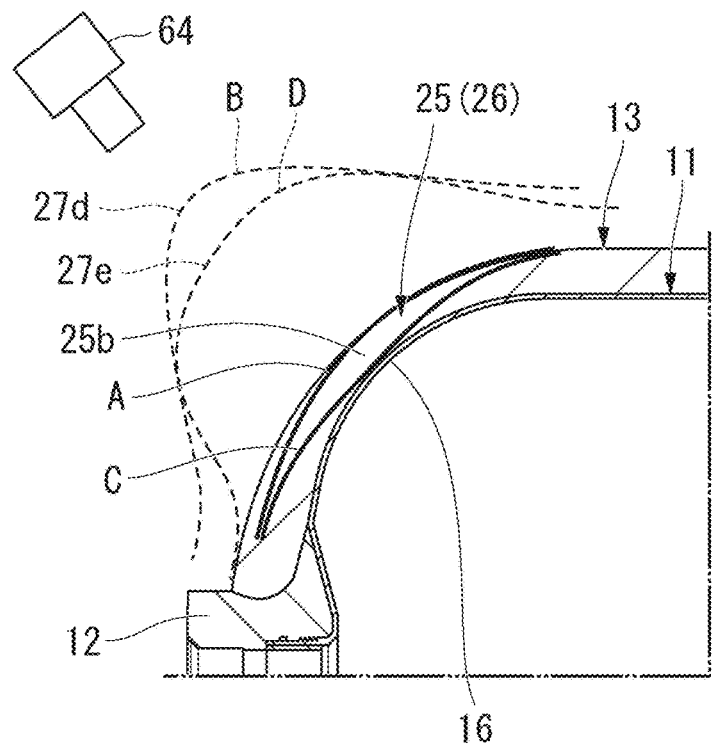
FIG. 8(a) is a diagram showing a state in which a fiber bundle wound on a converging portion of the liner is photographed.
FIG. 8(b) is a diagram showing an image obtained by photographing the fiber bundle satisfying a specified curvature.
FIG. 8(c) is a diagram showing an image obtained by photographing the fiber bundle not satisfying a specified curvature.
Figure 8:
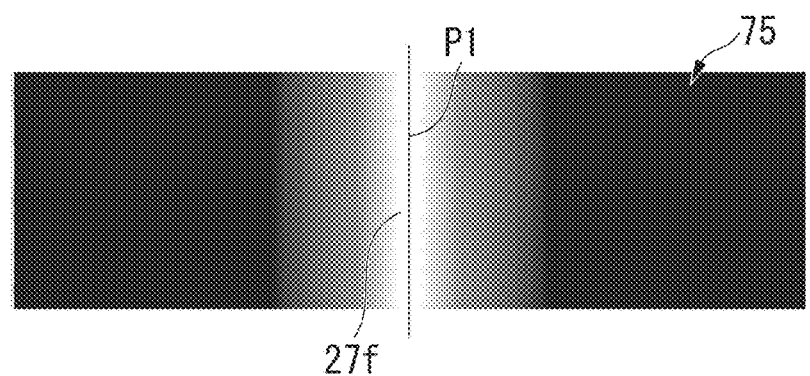
Figure 8:
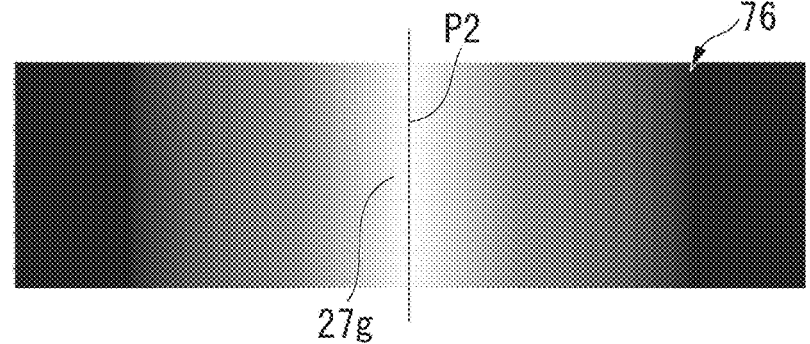

As shown in FIG. 8(*a*), the low helical winding forming portion is formed, for example, in such a manner that the fiber bundle 25 is wound on the converging portion 16 of the liner 11 in the low helical winding. The first photographing device 64 is brought close to face a curvature portion (shoulder portion) 25*b* having a large curvature in the fiber bundle 25 (the plurality of carbon fibers 26) wound in the low helical winding.

In FIG. 8(*a*), a state in which the plurality of carbon fibers 26 satisfy a specified curvature is indicated by the curve A and the distribution state of the reflected light of the curve A is indicated by the curve B. As indicated by the curve B, when the curvatures of the plurality of carbon fibers 26 satisfy the specification, a top portion 27*d* corresponding to the large curvature portion 25*b* in the distribution state of the reflected light can be tapered in a protruding manner.

A state in which the plurality of carbon fibers 26 do not satisfy a specified curvature is indicated by the curve C and the distribution state of the reflected light of the curve C is indicated by the curve D. As indicated by the curve D, when the curvatures of the plurality of carbon fibers 26 do not satisfy the specification, a top portion 27*e* corresponding to the large curvature portion 25*b* in the distribution state of the reflected light is formed flat.

As shown in FIGS. 8(*a*) and 8(*b*), the first photographing device 64 photographs the plurality of carbon fibers 26 satisfying a specified curvature. In a captured image 75, the reflected light 27*f* of the top portion 27*d* corresponding to the large curvature portion 25*b* in the distribution state of the reflected light indicated by the curve B is continuously and clearly projected in a linear shape. From this image 75, for example, a peak position P1 of the luminous intensity, a histogram G1 of the pixel values indicating the brightness of the light or the color of the light, and the like (see FIG. 9) can be obtained as the density information.

As shown in FIGS. 8(*a*) and 8(*c*), the first photographing device 64 photographs the plurality of carbon fibers 26 not satisfying a specified curvature. In a captured image 76, the reflected light 27*g* of the top portion 27*e* corresponding to the curvature portion 25*b* in the distribution state of the reflected light indicated by the curve D is continuously and relatively unclearly projected. From this image 76, for example, a peak position P2 of the luminous intensity, a histogram G2 (see FIG. 9) of the pixel values indicating the brightness of the light or the color of the light, and the like can be obtained as the density information. The histograms G1 and G2 of the pixel values will be described with reference to FIG. 9.

Figure 9:
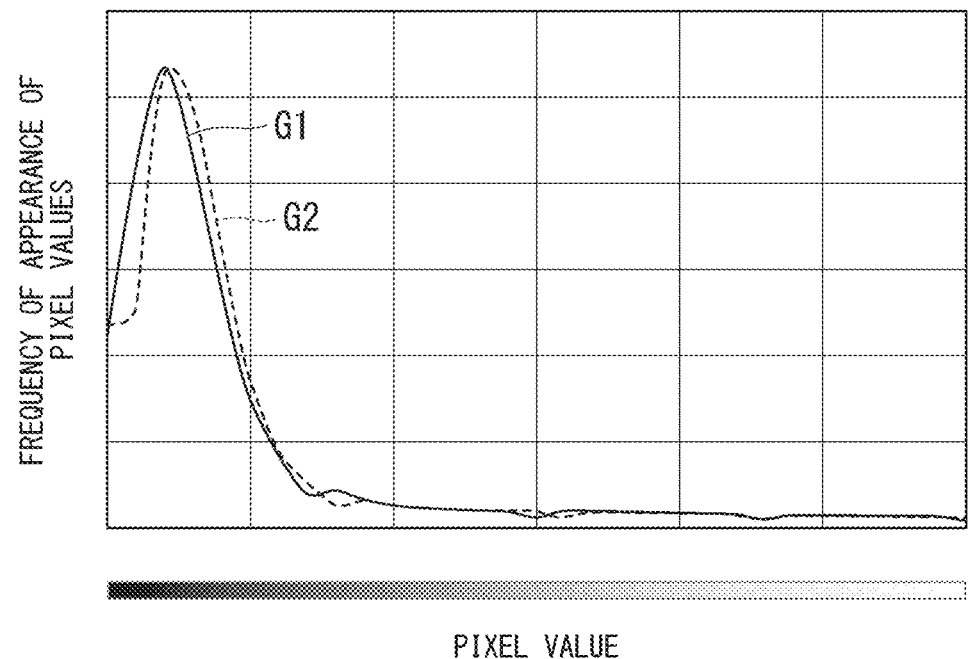
FIG. 9 is a graph showing a histogram of an image obtained by photographing a fiber bundle of the embodiment.

In the histogram of FIG. 9, the horizontal axis indicates the pixel value and the vertical axis indicates the frequency of appearance of pixel values. As shown in FIGS. 8(*a*) and 9, the histogram G1 of the pixel values can be obtained as an example of the density information from the image 75 (see FIG. 8(*b*)) obtained by photographing the plurality of carbon fibers 26 satisfying a specified curvature by the first photographing device 64.

The histogram G2 of the pixel values can be obtained as an example of the density information from the image 76 obtained by photographing the plurality of carbon fibers 26 not satisfying a specified curvature by the first photographing device 64.

Returning to FIGS. 2 and 3, in the acquiring step, the density information obtained by the reflection of the light with respect to the outer surface of the carbon fiber 26 by the photographing is acquired (step S4).

Specifically, the storage unit 54 stores (acquires) the density information of each layer of the low helical winding forming portion, the high helical winding forming portion, and the hoop winding forming portion converted by the conversion unit 53. The storage unit 54 stores the specified density information of each layer of the low helical winding forming portion, the high helical winding forming portion, and the hoop winding forming portion set in advance.

In the comparing step, the density information comparing unit 55 compares the density information of each layer obtained by the acquiring step with a threshold value of the preset density information of each layer (step S5).

That is, the density information of the image of the hoop winding forming portion captured by the third photographing device 66 is compared with the preset specified density information of the hoop winding forming portion. As the density information, the position of the carbon fiber 26 or the helical angle of the carbon fiber can be exemplified.

The density information of the image of the low helical winding forming portion captured by the first photographing device 64 is compared with the preset specified density information of the low helical winding forming portion. As the density information, the peak position of the luminosity of the curvature of the carbon fiber 26 or the histogram of the pixel values of the curvature of the carbon fiber can be exemplified.

For example, as the peak position of the luminosity of the curvature of the carbon fiber 26, the peak position P1 (see FIG. 8(*b*)) of the curvature of the low helical winding forming portion photographed by the first photographing device 64 is compared with the threshold value of the peak position of the preset curvature.

The peak position P2 (see FIG. 8(*c*)) of the curvature of the low helical winding forming portion photographed by the first photographing device 64 is compared with the threshold value of the peak position of the preset curvature.

Further, as the histogram of the pixel values of the carbon fiber 26, the histogram G1 (see FIG. 9) of the pixel values of the curvature of the low helical winding forming portion photographed by the first photographing device 64 is compared with the threshold value of the histogram of the pixel value of the preset curvature.

The histogram G2 (see FIG. 9) of the pixel value of the curvature of the low helical winding forming portion photographed by the first photographing device 64 is compared with the threshold value of the histogram of the pixel value of the preset curvature.

The density information of the curvature of the high helical winding forming portion photographed by the second photographing device 65 is compared with the specified density information of the high helical winding forming portion of the preset curvature. As the density information, the peak position of the luminosity of the curvature of the carbon fiber 26 or the histogram of the pixel values of the curvature of the carbon fiber can be exemplified.

In the determining step, it is determined whether the shape of the reinforcing layer 13 of the converging portion 16 or the body portion 15 of the liner 11 is good or bad on the basis of the comparison result of the comparing step (step S6).

Specifically, the determination unit 56 determines whether the shape of the reinforcing layer 13 (that is, each layer of the low helical winding forming portion, the high helical winding forming portion, and the hoop winding forming portion) is good or bad on the basis of the comparison result of the density information comparing unit 55.

In the statistical processing step, the statistical processing is performed on the good or bad shape of the reinforcing layer 13 (that is, each layer of the low helical winding forming portion, the high helical winding forming portion, and the hoop winding forming portion) on the basis of the determination result of the determining step (step S7). In the result outputting step, the statistical processing result of the statistical processing step is output (step S8).

As described above, according to the inspection method for the high-pressure container 10 and the inspection apparatus for the high-pressure container 10 of the embodiment, each layer of the outer surface is photographed by irradiating the outer surface of the carbon fiber 26 wound on the body portion 15 or the converging portion 16 of the liner 11 with light. The captured image is converted into the density information and the density information of the light reflected from the outer surface is acquired. The acquired density information is compared with the threshold value of the preset density information to determine whether the shape of the reinforcing layer 13 of the liner 11 is good or bad on the basis of the comparison result.

Thus, it is possible to highly accurately determine, for example, the curvature of the outer surface of the reinforcing layer 13 (that is, each layer of the low helical winding forming portion, the high helical winding forming portion) formed by the carbon fiber 26 without touching, for example, the carbon fiber 26 wound on the converging portion 16 of the liner 11. Accordingly, it is possible to evaluate the good or bad shape of the reinforcing layer (the low helical winding forming portion, the high helical winding forming portion) wound on the liner 11 (for example, the converging portion 16) without touching the fiber bundle 25 during the winding of the carbon fiber 26 (specifically, the fiber bundle 25).

For example, it is determined whether the high-pressure container 10 (for example, the reinforcing layer of the converging portion 16) is good or bad on the basis of the curvature of the carbon fiber obtained from the density information of the outer surface of the reinforcing layer (the low helical winding forming portion, the high helical winding forming portion) wound by the carbon fiber 26. Thus, it is possible to detect, for example, the lifting from the liner 11 (for example, the converging portion 16) due to the loosening of the carbon fiber 26 caused by a variation in tension of the carbon fiber 26 in addition to the detection of the displacement of the carbon fiber 26 during the winding of the carbon fiber 26. Accordingly, it is possible to visually determine whether a specified tension is applied to the wound carbon fiber 26.

Here, it is known that the converging portion 16 is a portion formed in a dome shape and the shape of the reinforcing portion wound on the converging portion 16 greatly affects, for example, the pressure resistance and durability of the high-pressure container 10.

Here, the first photographing device 64 or the second photographing device 65 is provided in a direction inclined from the rotating shaft 61 of the rotational driving member 51. Thus, the first photographing device 64 or the second photographing device 65 can be brought closer to (can be caused to face), for example, the portion (shoulder) having a large curvature in the carbon fiber wound on the converging portion 16 of the liner 11 in the low helical winding or the high helical winding.

Accordingly, for example, when the carbon fiber 26 passing through the converging portion 16 of the liner 11 formed in a dome shape is photographed in the winding of the carbon fiber 26, it is possible to highly accurately photograph the curvature of the outer surface of the carbon fiber 26 by the first photographing device 64 or the second photographing device 65. Thus, it is possible to highly accurately determine the curvature of the outer surface of the carbon fiber 26 in the converging portion 16 of the liner 11 and to provide the high-pressure container 10 capable of withstanding an increase in internal pressure due to the hydrogen filling in the high-pressure container 10.

The photographing is performed by the first photographing device 64 or the second photographing device 65 whenever the carbon fiber 26 passes through the converging portion 16. Accordingly, since it is possible to quickly stop the rewinding of the carbon fiber 26 or the winding of the carbon fiber 26 during the winding of the carbon fiber 26, it is possible to provide the high-quality high-pressure container 10.

Further, the carbon fiber 26 of the low helical winding forming portion is photographed by two devices which are the first photographing device 64 and the second photographing device 65.

Here, the length of the carbon fiber 26 (that is, the carbon fiber 26 passing through the converging portion 16) of the low helical winding forming portion is longer than the carbon fiber 26 of the high helical winding forming portion. By photographing the long carbon fiber 26 using two devices which are the first photographing device 64 and the second photographing device 65, it is possible to further highly accurately determine whether the curvature of the long carbon fiber 26 is good or bad.

The technical scope of the present invention is not limited to the above-described embodiment, and various modifications can be made without departing from the spirit of the present invention.

In addition, the components in the embodiment can be appropriately replaced with well-known components without departing from the spirit of the present invention, and the above-described modifications may be appropriately combined.

What is claimed is:

1. A high-pressure container inspection method for a high-pressure container which includes a liner provided with a body portion and a converging portion connected to the body portion and having a metal fitting formed at an end portion and is formed by winding a plurality of layers of a carbon fiber on an outer periphery of the liner to form a reinforcing layer, the high-pressure container inspection method comprising:

a photographing step of photographing at least an outer surface of the carbon fiber wound on the converging portion in the outer periphery while irradiating the outer surface with light;

an acquiring step of acquiring density information obtained by a reflection of the light with respect to the outer surface of the carbon fiber by the photographing; and a determining step of determining whether a shape of the reinforcing layer of the converging portion is good or bad by comparing the density information obtained by the acquiring step with preset density information, wherein a curvature of an outer surface of the reinforcing layer formed by the carbon fiber obtained from the density information is compared with a preset curvature to determine whether the high-pressure container is good or bad, wherein a first photographing device configured to perform photographing to include a low helical winding forming portion provided with a low helical winding corresponding to a helical winding having an inclination angle of less than 50° with respect to a longitudinal direction of the body portion and a second photographing device configured to perform photographing to include a high helical winding forming portion provided with a high helical winding corresponding to a helical winding having an inclination angle of 50° or more are provided, and wherein the low helical winding forming portion is photographed by the first photographing device and the second photographing device and the high helical winding forming portion is photographed by the second photographing device.

2. The high-pressure container inspection method according to claim 1, further comprising:

a winding step of winding the carbon fiber on the outer periphery of the liner, wherein the photographing is performed in a condition that the carbon fiber passes through the converging portion by the winding of the carbon fiber.

3. The high-pressure container inspection method according to claim 2, wherein the photographing is performed whenever passing through the converging portion by the winding of the carbon fiber.

4. A high-pressure container inspection apparatus comprising:

a photographing unit configured to photograph a carbon fiber wound on at least a converging portion of a liner in a plurality of layers to form a reinforcing layer;

a conversion unit configured to convert an image captured by the photographing unit into density information;

a storage unit configured to store preset density information and the density information converted by the conversion unit;

a density information comparing unit configured to compare the density information of each layer which is converted by the conversion unit and stored in the storage unit with a threshold value of the preset density information of each layer; and a determination unit configured to determine whether a shape of the reinforcing layer is good or bad on the basis of a comparison result of the density information comparing unit, wherein a curvature of an outer surface of the reinforcing layer formed by the carbon fiber obtained from the density information is compared with a preset curvature to determine whether a high-pressure container is good or bad, wherein the photographing unit includes a first photographing device configured to perform photographing to include a low helical winding forming portion provided with a low helical winding corresponding to a helical winding having an inclination angle of less than 50° with respect to a longitudinal direction of a body portion of the liner and a second photographing device configured to perform photographing to include a high helical winding forming portion provided with a high helical winding corresponding to a helical winding having an inclination angle of 50° or more, and wherein the low helical winding forming portion is photographed by the first photographing device and the second photographing device and the high helical winding forming portion is photographed by the second photographing device.

5. The high-pressure container inspection apparatus according to claim 4, further comprising:

a rotational driving member configured to rotate the liner, wherein the photographing unit is provided in a direction inclined from a rotating shaft of the rotational driving member.

* * * * *